United States Patent
Kaladgi et al.

(10) Patent No.: US 9,853,975 B2
(45) Date of Patent: Dec. 26, 2017

(54) RESTRICTING ACCESS TO CONTENT BASED ON MEASUREMENTS OF USER TERMINAL OPERATIONAL PERFORMANCE

(71) Applicant: CA, INC., New York, NY (US)

(72) Inventors: Jameel Ahmed Kaladgi, Kavalbyrasandra (IN); Kiran Kumar B. S., Thyagarajanagar (IN); Praveen Kumar Thakur, Seegehalli Village (IN)

(73) Assignee: CA, INC., New York, NY (US)

( * ) Notice: Subject to any disclaimer, the term of this patent is extended or adjusted under 35 U.S.C. 154(b) by 149 days.

(21) Appl. No.: 14/836,710

(22) Filed: Aug. 26, 2015

(65) Prior Publication Data
US 2017/0063854 A1 Mar. 2, 2017

(51) Int. Cl.
*H04L 29/06* (2006.01)
*G06F 21/62* (2013.01)

(52) U.S. Cl.
CPC ...... *H04L 63/0876* (2013.01); *G06F 21/6218* (2013.01)

(58) Field of Classification Search
CPC ........ G06F 21/10; G06F 21/44–21/445; G06F 21/57; G06F 21/6218; G06F 2221/2129; H04L 63/08; H04L 63/0876; H04L 63/10; H04L 63/102; H04W 12/06–12/12
See application file for complete search history.

(56) References Cited

U.S. PATENT DOCUMENTS

| | | | |
|---|---|---|---|
| 2010/0332396 A1* | 12/2010 | Etchegoyen | G06F 21/10 705/50 |
| 2015/0324559 A1* | 11/2015 | Boss | H04L 63/20 726/1 |
| 2016/0105435 A1* | 4/2016 | Turner | H04L 63/107 726/7 |

FOREIGN PATENT DOCUMENTS

WO  WO 2011/056533 A1  5/2011

* cited by examiner

*Primary Examiner* — Kevin Bechtel
(74) *Attorney, Agent, or Firm* — Sage Patent Group

(57) ABSTRACT

A processor of a user terminal performs operations that include obtaining a user identifier for a user operating the user terminal, measuring an initial operational performance metric of the user terminal, generating an initial terminal metric identifier from the initial operational performance metric, and communicating with a content server to register a combination of the initial terminal metric identifier and the user identifier for authorized access to content identified by a content identifier through the content server. Responsive to a request to access the content, a present operational performance metric of the user terminal is measured. A present terminal metric identifier is generated based on the present operational performance metric, and a combination of the user identifier and the present terminal metric identifier are communicated to the content server to request that the user using the user terminal be granted access through the content server to the content.

18 Claims, 5 Drawing Sheets

RESTRICTING ACCESS TO CONTENT BASED ON MEASUREMENTS OF USER TERMINAL OPERATIONAL PERFORMANCE

BACKGROUND

The present disclosure relates to controlling communications between communicating between computing terminals, and more particularly to controlling access attempts by multiple computing terminals to protected content.

Users can desire to access network accessible content from many different user terminals, such as desktop computers, laptop computers, tablet computers, mobile phones, game consoles, media players, etc. At times, a user may attempt to simultaneously access content from more than one user terminal. Typically, the user is permitted by a network accessible content server to have unrestricted access to the content from any user terminal after successfully completing authentication of credentials provided by the user and determining that the user is authorized to access the content.

SUMMARY

Some embodiments disclosed herein are directed to a method of performing operations on a processor of a user terminal. The operations include obtaining a user identifier for a user operating the user terminal, measuring an initial operational performance metric of the user terminal, generating an initial terminal metric identifier based on the initial operational performance metric, and communicating with a content server to register a combination of the initial terminal metric identifier and the user identifier for authorized access to content identified by a content identifier through the content server. The operations further include, responsive to a request to access the content identified by the content identifier through the content server, measuring a present operational performance metric of the user terminal. The operations further include generating a present terminal metric identifier based on the present operational performance metric, and communicating a combination of the user identifier and the present terminal metric identifier to the content server to request that the user using the user terminal be granted access through the content server to the content identified by the content identifier.

Some other embodiments disclosed herein are directed to a method of performing operations on a processor of a content server. The operations include, for each of a plurality of user terminals, storing in a repository an initial terminal metric identifier associated with a content identifier for content that is available through the content server and further associated with a user identifier. The initial terminal metric identifier is generated based on measurement of an operation performed by the user terminal. The operations further include receiving content request messages from user terminals requesting access to the content available through the content server. Each of the content request messages contain a user identifier, a content identifier, and a present terminal metric identifier which is generated based on measurement of a present operation performed by the user terminal. The operations further include, for each of the content identifiers in the repository, selectively granting access, through the content server to the content having the content identifier, for only ones of the content request messages that contain the present terminal metric identifier which matches the initial terminal metric identifier stored in the repository with an association to the content identifier in the repository matching the content identifier in the content request message and with a further association to the user identifier in the repository matching the user identifier contained in the content request message.

Other methods, user terminals, and content servers according to embodiments will be or become apparent to one with skill in the art upon review of the following drawings and detailed description. It is intended that all such additional methods, user terminals, and content servers be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
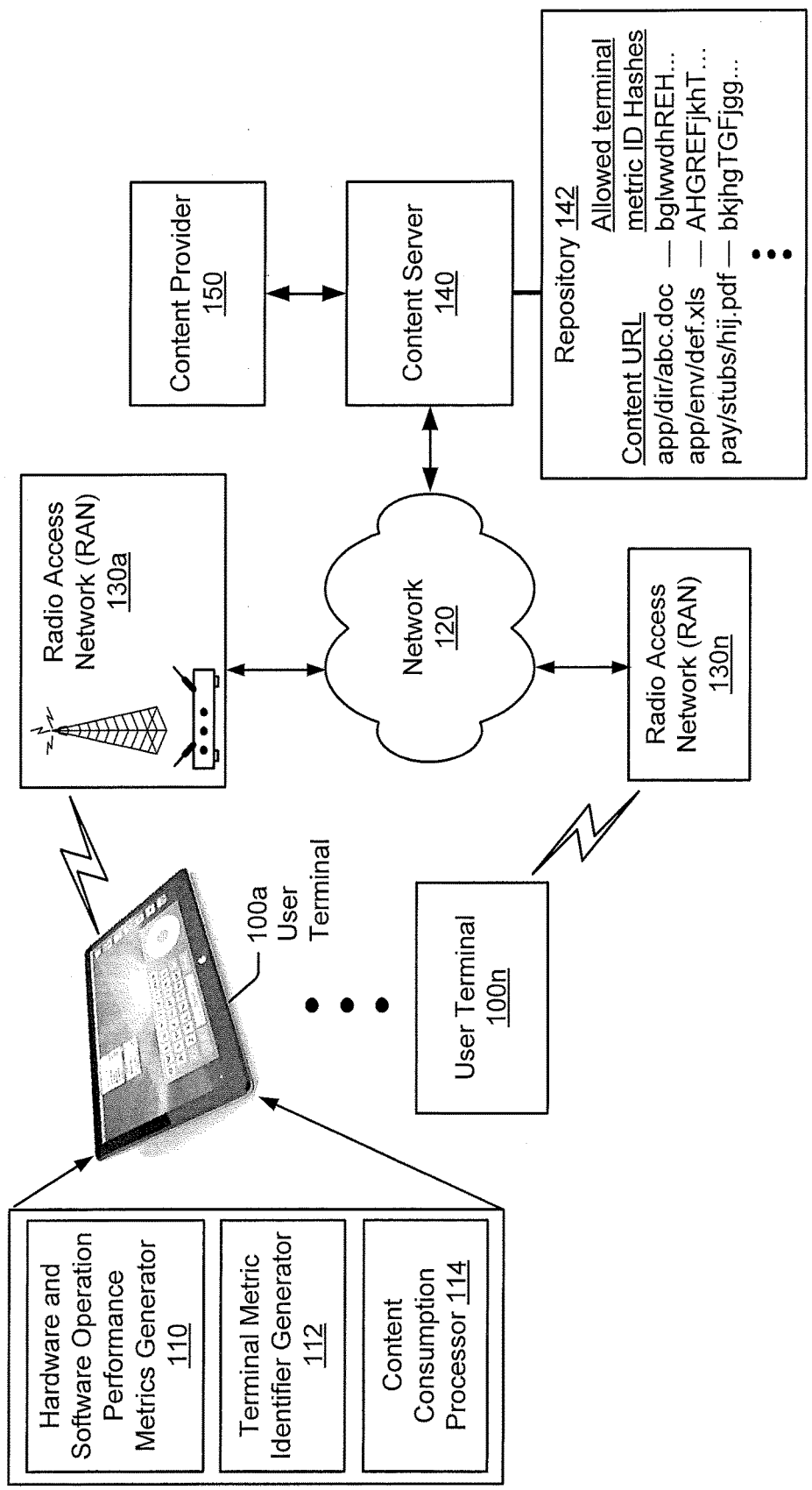
FIG. 1 is a block diagram of a system for restricting access to content available through a content server based on measurements of user terminal operational performance metrics, in accordance with some embodiments of the present disclosure.

Various embodiments will be described more fully hereinafter with reference to the accompanying drawings. Other embodiments may take many different forms and should not be construed as limited to the embodiments set forth herein. Like numbers refer to like elements throughout.

Some content owners would find it desirable to restrict some content, such as documents containing confidential information or copyrighted works, to being accessible to only authorized users while operating authorized terminals. The authorized terminals may be allowed access because they are determined to be more secure by design and/or trusted because of a known relationship to authorized users. For example, an authorized terminal may be provided by an employer or may be provided by a user who has registered the terminal for use in accessing the content. Such content owners would need a way to allow the content to be accessible only from user terminals having a confirmed identity. However, fraudsters have developed sophisticated techniques to obtain credentials of users who are authorized to access content. Some of these fraudsters have moreover developed sophisticated techniques to cause user terminals operated by the fraudsters to impersonate other user terminals.

Various embodiments of the present disclosure are directed to measuring certain defined hardware operations and/or software operations performed by the user terminal to generate operational performance metrics, and using the operational performance metrics to generate a terminal metric identifier that identifies the user terminal. The terminal metric identifier is then registered in a content server as having authorization to access certain content which is available through the content server. Access by an identified user to that content is then restricted to the user attempting such access while using a user terminal which can generate a terminal metric identifier which matches the registered terminal metric identifier.

As will be explained in further detail below, in one embodiment an operational performance metric is generated based on measuring an elapsed time for a processor of the user terminal to complete execution of a defined set of operations. Because the elapsed time will depend on processor clock rate, processor architecture, memory read/write speed, bus access speeds, minor variations introduced into each of these user terminal components during their fabrication which result in speed differences between any two processing platforms even when manufactured from the same component fabrication lines. The operational performance metric determined for a fraudster's user terminal will therefore be different from the operational performance metric determined for an authorized user's terminal, so that the operational performance metric can be used to uniquely identify the authorized user's terminal. In this manner, operational performance metrics determined in accordance with various embodiment disclosed herein can be used to more securely restrict access to content to user terminals which are operated by authorized users.

Moreover, in contrast to prior art approaches for identifying a user terminal using cookies stored on the user terminal, the terminal metric identifier can be generated using intrinsic operational performance characteristics of the user terminal which cannot be deleted or modified by the user. At least some measurements of the intrinsic operational performance characteristics of the user terminal are not affected by whether the user terminal is attempting to access content through a corporate intranet or the public internet.

In one embodiment, a content server is configured to allow content to be shared between users but restricted to being accessed through particular identified user terminals. During an initial registration process to register a single user terminal for authorized access to content, a user logs-into an application on the user terminal to provide a user identifier and a terminal metric identifier to the content server for registered access. The content server can prevent the same user from then accessing the content through the content server from any other user terminal which has not been granted access to the content.

FIG. 1 is a block diagram of a system for restricting access to content available through a content server 140 based on measurements of operational performance metrics determined for user terminals 100a-100n, in accordance with some embodiments of the present disclosure.

Referring to FIG. 1, a user may be able to operate each of the user terminals 100a-100n (individually referred to as user terminal 100) to attempt to access content through the content server 140 via one or more radio access networks 130a-130n and a data network 120. At times, the user may operate one or more of the user terminals 100a-100n simultaneously or in tandem to attempt to access the content. The user terminal 100 may be any electronic computing device that can communicate through one or more communication networks with the content server 140, including, but not limited to, a desktop computer, a laptop computer, a tablet computer, a mobile phone, a game console, a media player, etc.

In accordance with various embodiments disclosed herein, the content server 140 restricts access to the content to only authorized users who are operating authorized user terminals. In the example of FIG. 1, the user terminal 100 includes a hardware and software operation performance metrics generator 110, a terminal metric identifier generator 112, a content consumption processor 114. The generators 110 and 112 may be performed by lightweight code provided by the content server 140 or another provider interface for execution by the user terminal 100 during an on-line session to collect and transmit user data and metrics data. As will be explained in further detail below, a user can supply a user identifier and password to login to the content consumption processor 114 in order to request access to content available through the content server 140. The user identifier may otherwise be determined by the user terminal 100 such as using fingerprint authentication operations. The content may reside within the content server 140 and/or may available through the content server 140 from a content provider 150 (e.g., a streaming video subscription operator) and/or may be reside on the user terminal 100 in a locked format.

Responsive to authenticating the user, the content consumption processor 114 triggers the performance metrics generator 110 to measure one or more different types of hardware operational features of the user terminal 100 and/or measure one or more different types of software operational features of the user terminal 100 to generate one or more operational performance metrics. The terminal metric identifier generator 112 generates a terminal metric identifier based on the one or more operational performance metrics. In one embodiment, the identifier generator 112 generates the terminal metric identifier based on a mathematical combination of one or more user terminal hardware metrics and/or one or more user terminal software metrics. In a further embodiment, the terminal metric identifier is generated based on a result of hashing a plurality of operational performance metrics measured for a plurality of different types of hardware features and/or software features of the user terminal 100. The identifier generator 112 provides the terminal metric identifier and a user identifier to the content server 140 during the registration process to register the user and the user terminal 100 for authorized access to the content or during a subsequent process to request access to the content.

The content server 140 maintains a repository 142 having data structures that identify content which particular users are allowed to access and further identifies terminal metric identifiers that users are allowed to operate when accessing the content. The illustrated repository 142 contains data structures that list content URL addresses where content items can be accessed through the content server 140, and further list for each of the content URL addresses a hash value of a terminal metric identifier that is allowed to access the identify content URL address. Although the illustrated repository 142 illustrates a one-to-one mapping between any one of the content URL addresses and any one of the user terminal hash values, the repository 142 is not limited thereto and may map a plurality of content URL addresses to a single allowed user terminal hash value and/or map a single content URL address to a plurality of allowed user terminal hash values. More generally, the repository 142 can map any number of content identifiers to any number of combinations of authorized user IDs and authorized terminal metric identifiers.

In one non-limiting illustrative example, the terminal metric identifier is generated based on hashing a measured value for CPU speed, values representing a list of fonts available for use by applications on the user terminal, a value representing a type and/or version of operating system processed by the user terminal, a value representing the type of processor of the user terminal, a value representing a measurement of keyboard delay, a value representing a maximum resolution capability of a display device of the mobile terminal, etc.

Figure 2:
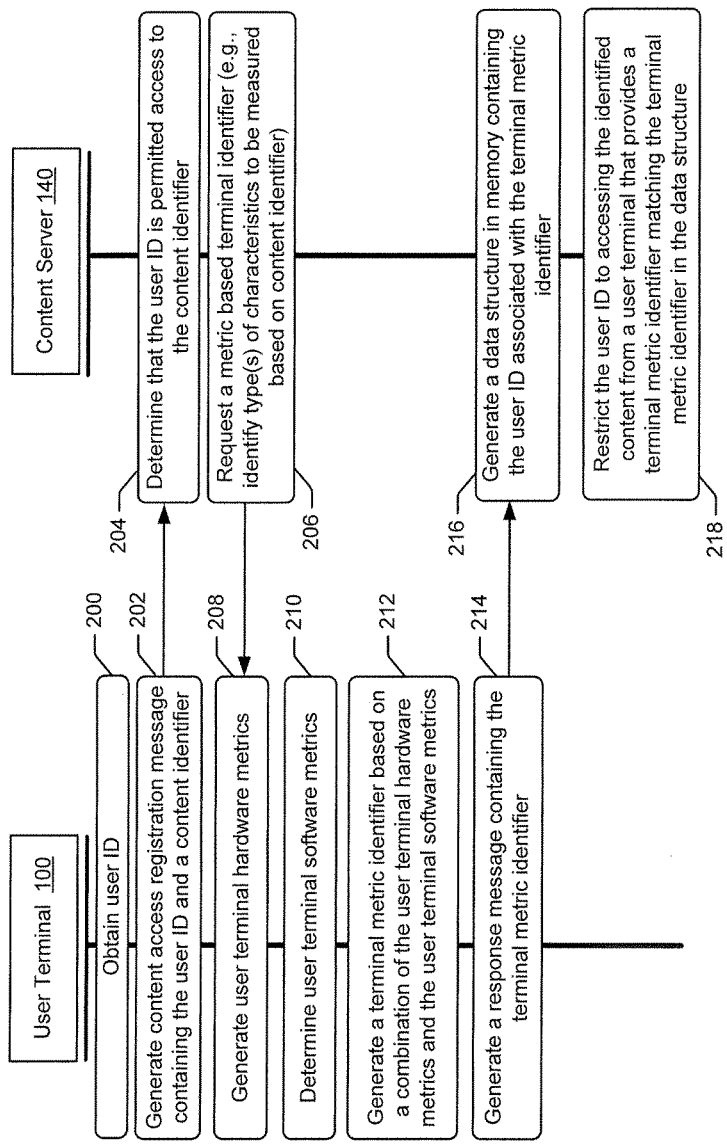
FIG. 2 is a combined data flow diagram and flowchart of registration operations by a user terminal and a content server for restricting access to content available through the content server based on measurements of user terminal operational performance metrics, in accordance with some embodiments of the present disclosure.

FIG. 2 is a combined data flow diagram and flowchart of registration operations performed by a user terminal 100 and a content server 140 for restricting access to content available through the content server 140 based on measurements of user terminal operational performance metrics, in accordance with some embodiments of the present disclosure. Referring to FIG. 2, during a registration process the user terminal 100 obtains (block 200) a user identifier for a user operating the user terminal 100. The user terminal 100 communicates (block 202) a generated content access registration message, which contains the user ID and a content identifier for the content, to the content server 140. The content server 140 determines (block 204) that the user ID is permitted access to the content identifier for content which is available through the content server 140. Responsive to the determination (block 204), the content server 140 communicates (block 206) a terminal identifier request message to the user terminal 100 that requests the user terminal 100 to generate an initial terminal metric identifier based on measurement of a present operation performed by the user terminal 100.

The user terminal 100 responsively generates (block 208) one or more hardware performance metrics of the user terminal 100 based on measurements of various defined order operations of the user terminal 100. The user terminal 100 may additionally or alternatively determine (block 210) one or more software metrics of the user terminal 100.

In one embodiment, the content server 140 can instruct the user terminal 100 to generate the hardware metrics and/or software metrics based on an identified one or more types of hardware features and/or software features which are selected by the content server 140 based on the user identifier and/or the content identifier received from the user terminal 100 via the content access registration message. In a further example embodiment, the content server 140 uses the user identifier and/or the content identifier contained in the content access registration message to select a plural defined number of different types of hardware and/or software features as a subset from among a superset of defined types of hardware and/or software features, which the user terminal 100 is to measure and use when generating the terminal metric identifier. The type and/or number of types of features selected by the content server 140 may be determined based on a level of security defined by a security policy for the user identifier and/or the content identifier. The content server 140 can provide such instructions to the user terminal 100 as content in the terminal identifier request message, and can record information in the repository 142 which identifies which types of hardware features and/or software features are used by the user terminal 100 to generate the terminal metric identifier. Example hardware features and/or software features that can be measured or determined by the user terminal 100 to generate corresponding metrics are explained in further detail herein, including with respect to FIG. 4.

The user terminal 100 generates (block 212) the terminal metric identifier based on a mathematical combination of one or more generated user terminal hardware metrics and/or one or more generated user terminal software metrics. The user terminal 100 may, for example, generate the terminal metric identifier based on a mathematical combination of between tens different defined types and thousands of different defined types of hardware and/or software metrics.

The user terminal generates (block 214) and communicates a response message containing the terminal metric identifier to the content server 140. The content server 140 generates (block 216) a data structure in the repository 142 in a memory. The data structure contains the user ID stored with an association to the terminal metric identifier and with a further association to the content identifier. The content server 140 then operates to restrict (block 218) the user ID to accessing the identified content from a user terminal that provides a terminal metric identifier which matches the terminal metric identifier residing in the data structure of the repository 142.

Figure 3:
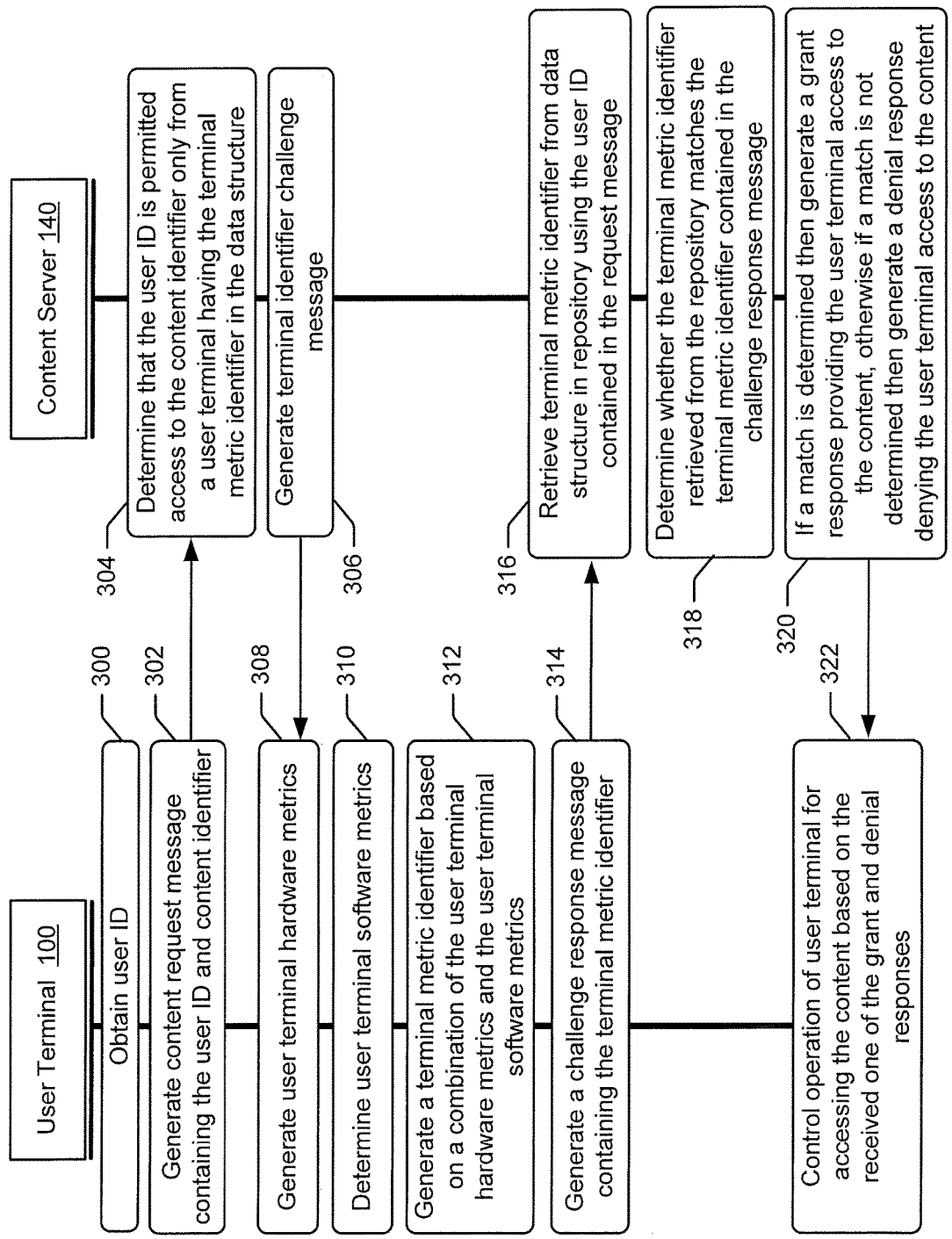
FIG. 3 is a combined data flow diagram and flowchart of operations by a user terminal and a content server for restricting access by content request messages to content available through the content server based on measurements of user terminal operational performance metrics, in accordance with some embodiments of the present disclosure.

FIG. 3 is a combined data flow diagram and flowchart of operations by the user terminal 100 and the content server 140 for restricting access by content request messages from the user terminal 100 and other user terminals to content available through the content server 140 based on measurements of user terminal operational performance metrics, in accordance with some embodiments of the present disclosure.

Referring to FIG. 3, when the authorized user desires to access the content having the content identifier, the user can operate the content consumption processor 114 of the user terminal 100 which has been earlier registered through the content server 140 and recorded in the repository 142 as having authorized access to that content. The user terminal 100, via the consumption processor 114, obtains (block 300) the user ID such as through a user login process, fingerprint recognition process, etc. Users terminal 100 generates (block 302) a content request message containing the user ID and the content identifier for the content that the user desires to access.

The content server 140 receives the content request message and determines (block 304) that the user ID is permitted access to the content identifier but only from the user terminal having the terminal metric identifier which has been registered in the data structure of the repository 142. The content server 140 generates (block 306) and communicates a terminal identifier challenge message to the user terminal 100. The content consumption processor 114 of the user terminal 100 triggers the performance metrics generator 110 to measure one or more different types of hardware operational features of the user terminal 100a and/or measure one or more different types of software operational features of the user terminal 100a to generate one or more operational performance metrics. The terminal metric identifier generator 112 generates a terminal metric identifier based on the one or more operational performance metrics. In one embodiment, the generator 112 generates the terminal metric identifier based on a mathematical combination of one or more user terminal hardware metrics and/or one or more user terminal software metrics. In a further embodiment, the terminal metric identifier is generated based on a result of hashing a plurality of operational performance metrics measured for a plurality of different types of hardware features and/or software features of the user terminal 100.

In one embodiment, the content server 140 can instruct the user terminal 100 to generate the hardware metrics and/or software metrics based on one or more types of hardware features and/or software features which are selected by the content server 140 based on the user identifier and/or the content identifier received from the user terminal 100 via the content access registration message. The generator 112 provides the terminal metric identifier to the content server 140 as content of a challenge response message.

In one embodiment, the content server 140 can instruct the user terminal 100 to generate the hardware metrics and/or software metrics based on an identified one or more types of hardware features and/or software features which are selected by the content server 140 based on the user identifier and/or the content identifier received from the user terminal 100 via the content request message (block 302). In a further example embodiment, the content server 140 uses the user identifier and/or the content identifier contained in the content request message to select a plural defined number of different types of hardware and/or software features as a subset from among a superset of defined types of hardware and/or software features, which the user terminal 100 is to measure (blocks 308 and/or 310) and use when generating (block 312) the terminal metric identifier. The content server 140 can perform the selection based on information recorded in the repository 142 that identifies which types of features were used by the user terminal 100 when generating the terminal metric identifier that has been stored in the repository 142 during the terminal registration process. The content server 140 can provide such instructions to the user terminal 100 as content in the terminal identifier challenge message (block 306), and may further record information in the repository 142 which identifies which types of hardware features and/or software features are used by the user terminal 100 to generate the terminal metric identifier. Example hardware features and/or software features that can be measured or determined by the user terminal 100 to generate corresponding metrics are explained in further detail herein, including with respect to FIG. 4.

The content server 140 uses the user ID contained in the content request message to retrieve (block 316) the terminal metric identifier from the data structure in the repository 142. The content server 140 determines (block 318) whether the terminal metric identifier retrieve from the repository 142 matches the terminal metric identifier contained in the challenge response message. If a match is determined, the content server 140 generates (block 320) a grant response message providing the user terminal 100 access to the content. Otherwise, if a match is not determined, the content server 140 generates (block 320) a denial response message denying the user terminal 100 access to the content. The grant response message or the denial response message can be communicated to the user terminal 100. The user terminal 100 controls (block 322) its operations for attempting access to the content based on the received grant or denial response message.

In one embodiment, the grant response provided to the user terminal 100 contains a code which is used to unlock content residing in memory of the user terminal 100. In another embodiment, the grant response provided to the user terminal 100 notifies the user that the content will be provided through the user terminal 100 and/or contains a code which is used by the user terminal 100 to obtain the content through the content server 140. The content server 140 may encrypt the content provided to the user terminal 100, and the user terminal 100 may operate to decrypt the content using a key that was provided to the mobile terminal 100 as content of the grant response message.

In this manner, intrinsic operational performance characteristics of the user terminal 100 are used to generate a terminal metric identifier that uniquely identifies the user terminal 100 and which may not be impersonated by a fraudster operating any other user terminal. The content server 140 can therefore restrict access to the content having the content identifier to when the authorized user is operating the user terminal 100 which provides a terminal metric identifier that matches the terminal metric identifier that was stored in the repository 142, during registration of the user terminal 100 for access to the content having the content identifier.

Although the operations of FIGS. 2 and 3 have been described in the context of a single user terminal, these operations can be performed to register a plurality of users operating a plurality of different user terminals for authorized access to any number of content items having any number of content identifiers, and can furthermore be performed to restrict access to each of the content identifiers to authorized users who are operating authorized ones of the user terminals. The content server 140 can therefore receive content access registration messages and content request messages from any number of user terminals 100 with respect to any number of content items that are available through the content server 140. By repeating the operations of FIGS. 2 and 3, the content server 140 can operate to, for each of the content identifiers in the repository 142, selectively grant access, through the content server 140 to the content having the content identifier, for only ones of the content request messages that contain the present terminal metric identifier which matches the registered terminal metric identifier stored in the repository with an association to the content identifier in the repository matching the content identifier in the content request message and with a further association to the user identifier in the repository matching the user identifier contained in the content request message.

Although FIG. 2 illustrates a content access registration message (block 202) that is communicated separately from a response message (block 214), it is to be understood that the messages can be combined into a single message or that more messages may be used. Thus, for example, the user terminal may generate the operational performance metrics and generate a terminal metric identifier therefrom and which can be provided within the content access registration message communicated to the content server 140. Similarly, although FIG. 3 illustrates the content request message (block 302) this communicated separately from the challenge response message (block 314) is be understood that the messages can be combined into a single message or that more messages may be used. For example, the user terminal may generate the operational performance metrics and generate the terminal metric identifier therefrom and which can be provided within the content request message communicated to the content server 140.

In a further example embodiment, based on a first portion of one of the content messages from one of the user terminals, the content server 140 determines that the user identifier contained in the one of the content messages is permitted to access the content identifier contained in the one of the content messages only when using a user terminal that can generate the initial terminal metric identifier which is stored in the repository with an association to the content identifier in the repository 142 matching the content identifier in the first portion of the one of the content messages and with a further association to the user identifier in the repository 142 matching the user identifier contained in the first portion of the one of the content messages. The content server 140 communicates a terminal identifier challenge message to the one of the user terminals, where the terminal identifier challenge message requests the one of the user terminals to generate a present terminal metric identifier based on measurement of a present operation performed by the one of the user terminals. The content server 140 receives from the one of the user terminals a challenge response message containing the present terminal metric identifier, where the challenge response message represents a second portion of the one of the content messages from the one of the user terminals.

The content server 140 then operates, based on the present terminal metric identifier matching the initial terminal metric identifier which is stored in the repository 142 with an association to the content identifier in the repository 142 matching the content identifier in the first portion of the one of the content messages and with a further association to the user identifier in the repository 142 matching the user identifier contained in the first portion of the one of the content messages, to communicate to the one of the user terminals a grant response providing the one of the user terminals access through the content server 140 to the content identified by the content identifier in the first portion of the one of the content messages.

In sharp contrast, based on the present terminal metric identifier not matching the initial terminal metric identifier which is stored in the repository 142 with an association to the content identifier in the repository 142 matching the content identifier in the first portion of the one of the content messages and with a further association to the user identifier in the repository 142 matching the user identifier contained in the first portion of the one of the content messages, the content server communicates to the one of the user terminals a denial response denying the one of the user terminals access through the content server 140 to the content identified by the content identifier in the first portion of the one of the content messages.

Figure 4:
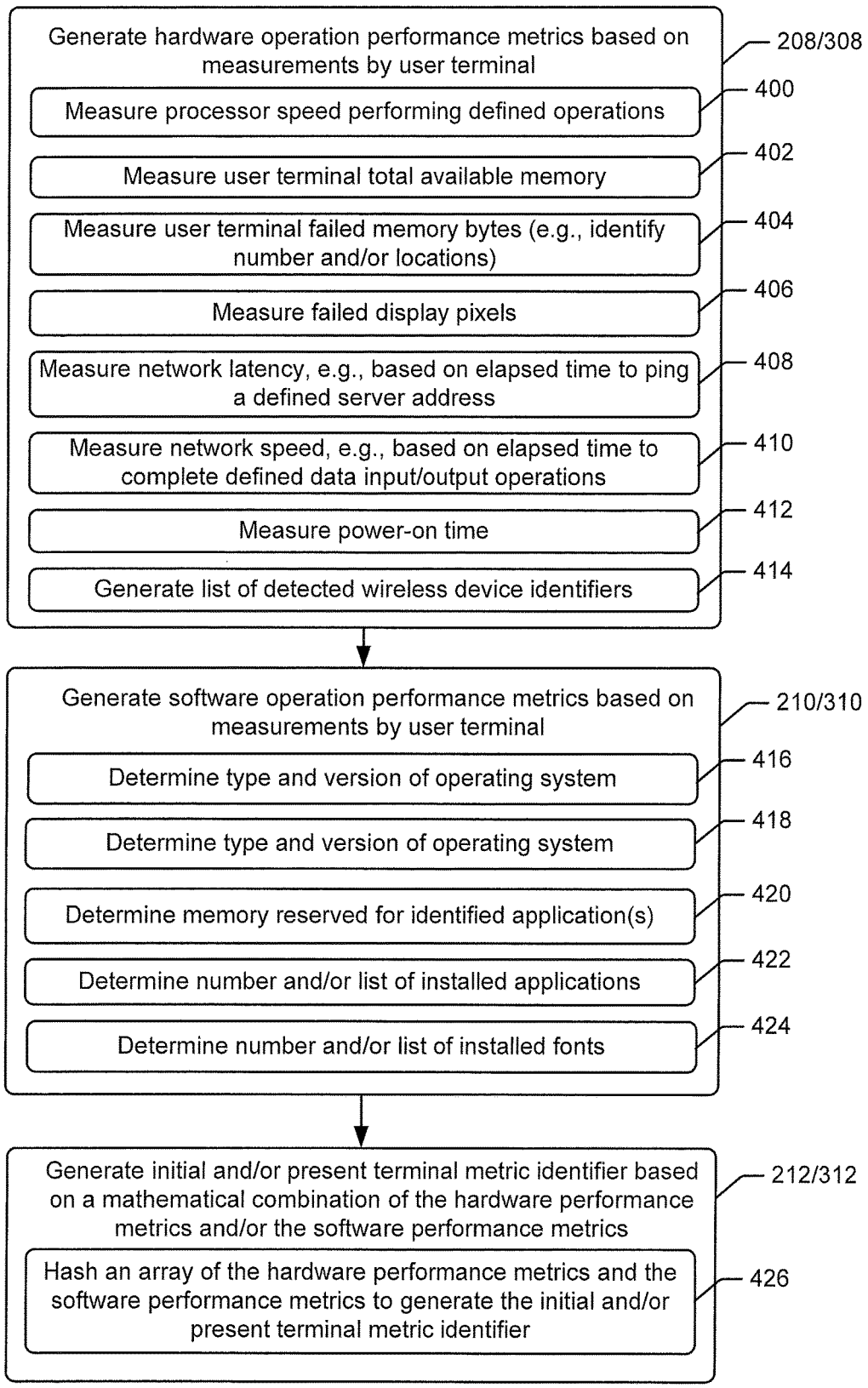
FIG. 4 is a flowchart of operations by a user terminal to generate hardware and software operational performance metrics based on measurements by the user terminal, and to generate a terminal metric identifier therefrom that identifies the user terminal for use in controlling its access to content available through the content server, in accordance with some embodiments of the present disclosure.

FIG. 4 is a flowchart of operations by a user terminal 100 to generate hardware and software operational performance metrics based on measurements by the user terminal 100, and to generate a terminal metric identifier therefrom that identifies the user terminal 100 for use in controlling its access to content available through the content server 140, in accordance with some embodiments of the present disclosure.

Referring to FIG. 4, the user terminal 100 generates hardware operational performance metrics and/or software metrics based on measurements by the user terminal 100. One or more of the illustrated operations may be performed during the registration process of FIG. 2 to generate (block 208) hardware performance metrics and/or determine (block 210) software metrics. One or more of the illustrated operations may additionally or alternatively be performed during the terminal authorization process of FIG. 3 to generate (block 308) hardware performance metrics and/or determine (block 310) software metrics.

The user terminal 100 can generate user terminal hardware metrics based on measuring (block 400) an processing speed of the user terminal 100 while performing defined operations. In one embodiment, the user terminal 100 measures an elapsed time for a processor of the user terminal 100 to complete execution of a defined set of operations, and generates the operational performance metric based on the elapsed time. Because the elapsed time will depend on processor clock rate, processor architecture, memory read/write speed, and bus access speeds, minor variations introduced into each of these user terminal components during their fabrication which result in speed differences between any two processing platforms even when manufactured from the same component fabrication lines. The elapsed time determined by a fraudster's user terminal should therefore be different from the elapsed time determined by an authorized user's terminal 100. Consequently, the terminal metric identifiers generated by the fraudster's and the authorized user's terminals based on their separate measurements of the elapsed time should be different.

The user terminal 100 may generate the performance metric information based on measuring (block 402) the total available memory in the user terminal 100. The user terminal 100 may generate the operational performance metric based on measuring (block 404) the number of failed memory bytes in a memory of the user terminal 100. Thus, for example, an application executed by the user terminal 100 may identify failed memory bytes and count the number of failed memory bytes, or may obtain that count from another circuit or application. Because the number of failed memory bytes in a memory of the fraudster's user terminal should be different from the number of failed memory bytes in a memory of the authorized user's terminal 100, the terminal metric identifiers generated by the fraudster's and the authorized user's terminals based on their separate determinations of the number of failed memory bytes should be different.

The user terminal 100 may generate the operational performance metric based on measuring (block 406) the number of failed display pixels in a display device of the user terminal 100. Because the number of failed display pixels in a display device of the fraudster's user terminal will likely be different from the number of failed display pixels in a display device of the authorized user's terminal 100, the terminal metric identifiers generated by the fraudster's and the authorized user's terminals based on their separate measurements of the number of failed display pixels should be different.

The user terminal 100 may generate the operational performance metric based on determining (block 408) network latency, which may be determined based on measuring network communication latency for a communication between the user terminal 100 and a defined server address through the data network 120. In one embodiment, the user terminal 100 measures an elapsed time between communicating a ping request to a network server and receiving a ping response from the network server, and then generates the operational performance metric based on the elapsed time. Because the physical distance over which the message propagates from the user terminal 100 to the network server and the number of forwarding nodes in the network between the user terminal 100 to the network server will be different for the message from the fraudster's user terminal compared to the message from the authorized user's terminal 100, the terminal metric identifiers generated by the fraudster's and the authorized user's terminals based on their separate measurements of the elapsed time should be different.

The user terminal 100 may generate the operational performance metric based on measuring (block 410) network speed, which may be determined based on measuring elapsed time to complete a defined data input and/or output operations with a defined network server through the data network 120. Again, because the physical distance over which the data propagates between the user terminal 100 and the network server and the number of forwarding nodes in the network will be different for the data input/output with the fraudster's user terminal compared to the data input/output with the authorized user's terminal 100, the terminal metric identifiers generated by the fraudster's and the authorized user's terminals based on their separate measurements of the network speed should be different.

The user terminal 100 may generate the operational performance metric based on measuring (block 412) a tracked total operational power-on time since initialization of the user terminal 100. Again, the operational performance metric generated by a fraudster's user terminal based on tracked total operational power-on time should be different and, consequently, the resulting terminal metric identifier generated therefrom should be different from what is generated for the authorized user's terminal 100.

The user terminal 100 may generate the operational performance metric based on generating (block 414) a list of wireless device identifiers of wireless devices that are detectable by the user terminal 100 through one or more wireless transceiver interfaces of the user terminal 100. The list may include wireless device identifiers of wireless devices that are observable through any type of wireless communication technology by the user terminal 100. In one example embodiment, the list of wireless device identifiers can include a list of Bluetooth devices that indicated to have established a traffic data connection through completing pairing to the user terminal 100, but alternatively or additionally the list can include Bluetooth devices that are not paired to the user terminal 100 but are presently observed to be within communication range of a Bluetooth transceiver of the user terminal 100 through operations for discovering Bluetooth devices. In another example embodiment, the list of wireless device identifiers can include a list of wireless local area network, WLAN, (e.g., WIFI) devices that are indicated to have established a traffic data connection with the user terminal 100 through joining a shared network that includes the user terminal 100 (e.g., WIFI shared network or WIFI Direct), but alternatively or additionally the list can include WLAN devices that are not connected to the user terminal 100 but which have been discovered to be within communication range of a WLAN transceiver of the user terminal 100 through operations for discovering WLAN routers and other devices. Because the lists of wireless device identifiers detected by the authorized user's terminal 100 (e.g., within the authorized user's home or office) will likely be different from the wireless device identifiers detected by a fraudster's user terminal, the terminal metric identifiers generated therefrom should be different between the user terminals.

The user terminal 100 may generate one or more software operational performance metrics based on measurements or other determinations by the user terminal 100. The one or more software operational performance metrics can be determined based on any one or more of: determining (block 416) a type and version of an operating system executed by the user terminal 100; determining (block 418) an amount of memory reserved for use by one or more identified applications hosted by the user terminal 100; determining (block 420) a number and/or a list of presently executing applications by the user terminal 100 and/or determining a list of applications that are stored in nonvolatile memory of the user terminal 100 and/or a list of applications that are available for execution; determining (block 422) permission settings for one or more identified applications residing in the user terminal 100; and determining (block 424) a number of fonts installed in the user terminal 100 and/or based on a list of the fonts installed in the user terminal 100.

In one example embodiment, the user terminal generates a software operational performance metric based on a list of applications stored in the user terminal 100 and the permission settings that have been defined for each of those applications. The permission settings that can be determined for an application based on whether the application has been granted access to any one or more of the following: permission to access camera data from a camera; permission to access audio data from a microphone; permission to write data to a defined external interface of the user terminal 100; permission to read data from a defined external interface of the user terminal 100; permission to access sensor data from a defined sensor of the user terminal 100; permission to be informed when the user terminal 100 becomes unlocked; permission to access the Internet; and permission to access geolocation information of the user terminal 100.

The user terminal 100 then generates (e.g., block 212 of FIG. 2 and/or block 312 of FIG. 3) a terminal metric identifier based on a mathematical combination of one or more of the hardware performance metrics and/or one or more of the software performance metrics. In one embodiment, the terminal metric identifiers generated based on a result of hashing an array of the hardware performance metrics and the software performance metrics. The user terminal 100 provides the terminal metric identifier to the content server 140 during the registration process to register the user and the user terminal for authorized access to the content and during the subsequent content access request process to request access to the content.

In some further embodiments, the mobile terminal 100 and/or the content server 140 can be configured to compensate for variability in the operational performance metrics that can occur between measurements by the user terminal 100. For example, the user terminal 100 may track changes that its measures or observes over time in various of the operational performance metrics and may provide notice of those changes to the content server 140 to allow the content server 140 to compensate for the changes and/or the user terminal 100 may use the tracked changes locally to compensate for the changes when generating the terminal metric identifier the types of operational performance metrics used to generate the terminal metric identifier may be controlled based on the observed tracked changes. For example, operational performance metrics that experience rapid changes (e.g., non-linear changes) during early life of the user terminal 100 may not be selected for use for generating the terminal metric identifier until a threshold rate of change is observed (e.g., using linear predictable changes).

Figure 5:
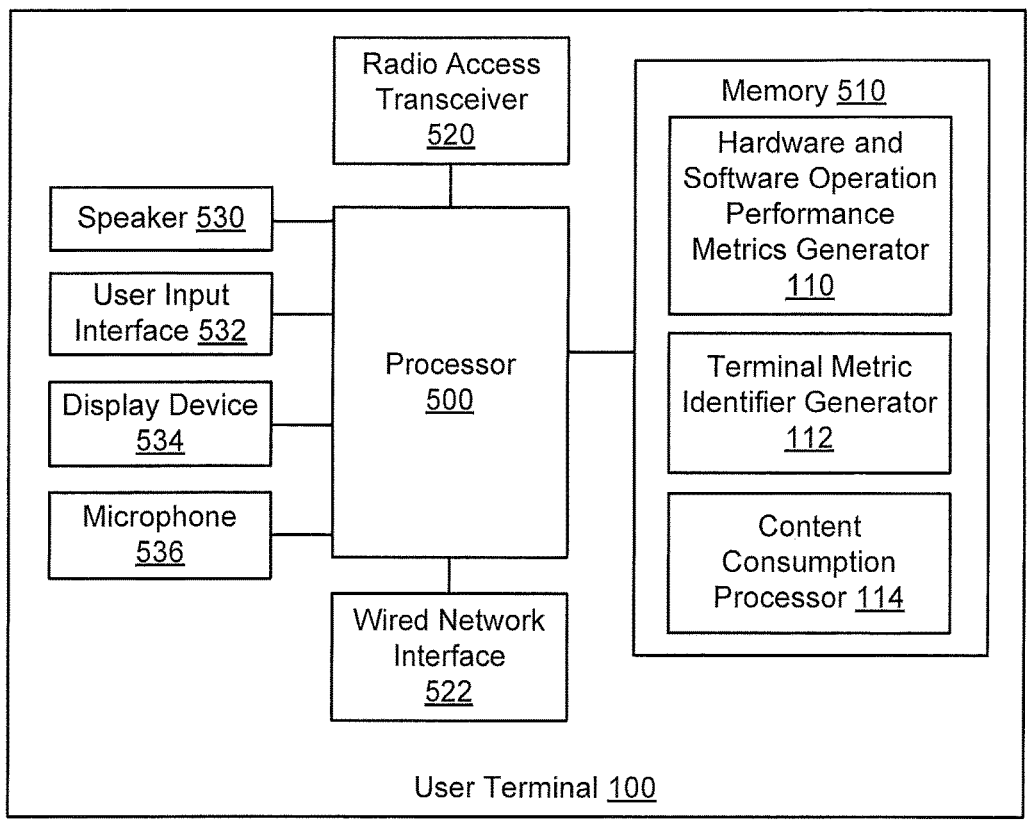
FIG. 5 is a block diagram of a user terminal configured according to some embodiments of the present disclosure.

FIG. 5 is a block diagram of a user terminal 100 configured according to some embodiments of the present disclosure. Referring to FIG. 5, the mobile terminal 100 includes a processor 500, a memory 510, and a network interface which may include a radio access transceiver 520 and/or a wired network interface 522 (e.g., Ethernet interface). The radio access transceiver 520 can include, but is not limited to, a LTE or other cellular transceiver, WLAN transceiver (IEEE 802.11), WiMax transceiver, or other radio communication transceiver configured to communicate with the content server 140 via the radio access network 130.

The processor 500 may include one or more data processing circuits, such as a general purpose and/or special purpose processor, such as a microprocessor and/or digital signal processor. The processor 500 is configured to execute computer program code in the memory 510, described below as a non-transitory computer readable medium, to perform at least some of the operations described herein as being performed by a user terminal. The computer program code may include the hardware and software operational performance metrics generator 110, the terminal metric identifier generator 112, and the content consumption processor 114. The user terminal 100 may further include a speaker 530, user input interface 532 (e.g., touch screen, keyboard, keypad, etc.), a display device 534, and a microphone 536.

Figure 6:
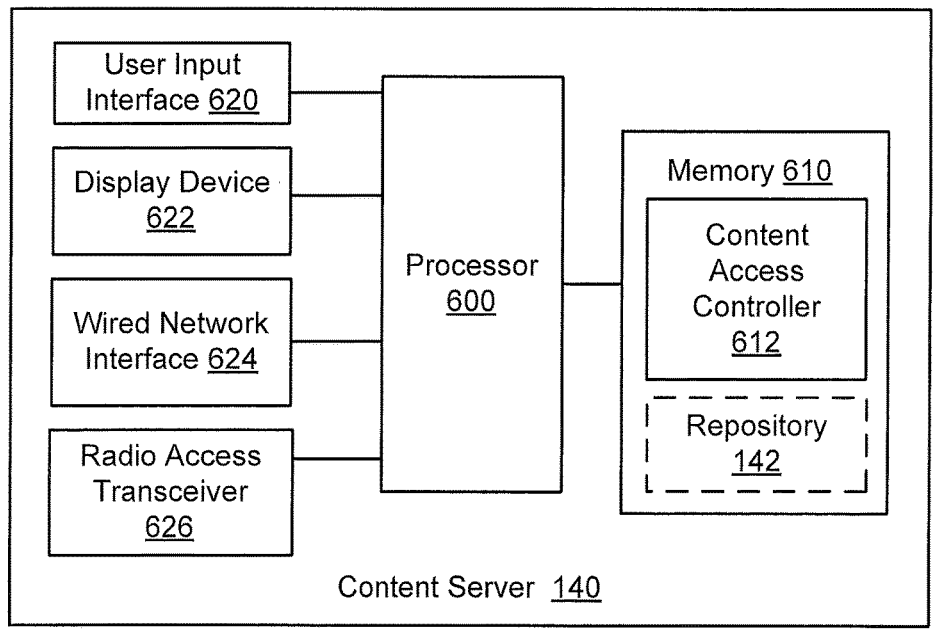
FIG. 6 is a block diagram of a content server configured according to some embodiments of the present disclosure.

FIG. 6 is a block diagram of a content server 140 configured according to some embodiments of the present disclosure. The content server 140 includes a processor 600, a memory 610, and a network interface which may include a radio access transceiver 626 and/or a wired network interface 624 (e.g., Ethernet interface). The radio access transceiver 626 can include, but is not limited to, a LTE or other cellular transceiver, WLAN transceiver (IEEE 802.11), WiMax transceiver, or other radio communication transceiver configured to communicate with the user terminal 100 via the radio access network 130.

The processor 600 may include one or more data processing circuits, such as a general purpose and/or special purpose processor (e.g., microprocessor and/or digital signal processor) that may be collocated or distributed across one or more networks. The processor 600 is configured to execute computer program code in the memory 610, described below as a non-transitory computer readable medium, to perform at least some of the operations described herein as being performed by an application analysis computer. The computer program code may include a content access controller 612 configured to register users and user terminals for authorized access to content, and to control access by users and user terminals to the content based on one or more of the embodiments disclosed herein. The memory 610 may further include the repository 142 and may further include content that can be provided to user terminals. The content can include, but is not limited to, application program code, digital video, digital audio, digital pictures, user information, webpage information, etc. The content server 140 may further include a user input interface 620 (e.g., touch screen, keyboard, keypad, etc.) and a display device 622.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
performing operations as follows on a processor of a user terminal:
obtaining a user identifier for a user operating the user terminal;
measuring an initial operational performance metric of the user terminal;
generating an initial terminal metric identifier based on the initial operational performance metric;
communicating with a content server to register a combination of the initial terminal metric identifier and the user identifier for authorized access to content identified by a content identifier through the content server;
communicating to the content server a content request message containing the user ID and the content identifier;
responsive to communicating to the content server the content request message, receiving a terminal identifier challenge message from the content server comprising an instruction to the user terminal to measure a subset of a plural defined number of different types of one of hardware and software features from among a superset of defined different types of one of hardware and software features that the user terminal is configured to be able to measure, the subset of the plural defined number of different types of one of hardware and software features being associated with a determined level of security defined by a security policy for one of the user identifier and the content identifier;
responsive to receiving the terminal identifier challenge message from the content server, measuring a present operational performance metric of the user terminal;
generating a present terminal metric identifier based on the present operational performance metric;
communicating a combination of the user identifier and the present terminal metric identifier to the content server to request that the user using the user terminal be granted access through the content server to the content identified by the content identifier.

2. The method of claim 1, wherein the communicating with a content server to register a combination of the initial terminal metric identifier and the user identifier for authorized access to content identified by a content identifier through the content server, comprises:
communicating to the content server a content access registration message containing the user identifier and the content identifier;
receiving a terminal identifier request message from the content server;
responsive to receiving the terminal identifier request message from the content server, performing the measuring an initial operational performance metric of the user terminal and the generating an initial terminal metric identifier based on the initial operational performance metric; and communicating to the content server a response message containing the initial terminal metric identifier.

3. The method of claim 2, wherein:
the communicating a combination of the user identifier and the present terminal metric identifier to the content server to request that the user using the user terminal be granted access through the content server to the content identified by the content identifier, comprises:
communicating to the content server a challenge response message containing the combination of the user identifier and the present terminal metric identifier.

4. The method of claim 1, wherein:
the measuring an initial operational performance metric of the user terminal, comprises:
measuring an elapsed time for a processor of the user terminal to complete execution of a defined set of operations, wherein the initial operational performance metric is based on the elapsed time; and
the, responsive to receiving the terminal identifier challenge message from the content server, measuring a present operational performance metric of the user terminal, comprises:
measuring another elapsed time for the processor of the user terminal to complete execution of the defined set of operations, wherein the present operational performance metric is based on the another elapsed time.

5. The method of claim 1, wherein:
the measuring an initial operational performance metric of the user terminal, comprises:
measuring a number of failed memory bytes in a memory of the user terminal, wherein the initial operational performance metric is based on the number of failed memory bytes; and
the, responsive to receiving the terminal identifier challenge message from the content server, measuring a present operational performance metric of the user terminal, comprises:
measuring a present number of failed memory bytes in the memory of the user terminal, wherein the present operational performance metric is based on the present number of failed memory bytes.

6. The method of claim 1, wherein:
the measuring an initial operational performance metric of the user terminal, comprises:
measuring an elapsed time between communicating a ping request to a network server and receiving a ping response from the network server, wherein the initial operational performance metric is based on the elapsed time; and
the, responsive to receiving the terminal identifier challenge message from the content server, measuring a present operational performance metric of the user terminal, comprises:
measuring a present elapsed time between communicating a ping request to the network server and receiving a ping response from the network server, wherein the present operational performance metric is based on the present elapsed time.

7. The method of claim 1, wherein:
the measuring an initial operational performance metric of the user terminal, comprises:
generating a list of wireless device identifiers that are detected by a transceiver of the user terminal, wherein the initial operational performance metric comprises the list of wireless device identifiers; and
the, responsive to a receiving the terminal identifier challenge message from the content server, measuring a present operational performance metric of the user terminal, comprises:
generating a present list of wireless device identifiers that are detected by a transceiver of the user terminal, wherein the present operational performance metric comprises the present list of wireless device identifiers.

8. The method of claim 1, wherein:
the measuring an initial operational performance metric of the user terminal, comprises:
determining an amount of memory reserved for use by an identified application, wherein the initial operational performance metric is based on the amount of memory reserved; and
the, responsive to receiving the terminal identifier challenge message from the content server, measuring a present operational performance metric of the user terminal, comprises:
determining a present amount of memory reserved for use by the identified application, wherein the present operational performance metric is based on the present amount of memory reserved.

9. The method of claim 1,
further comprising, for each of a plural defined number of different types of hardware features of the user terminal, measuring operational performance of the type of hardware feature to generate an initial operational performance metric for the type of hardware feature;
wherein the generating an initial terminal metric identifier based on the initial operational performance metric, comprises mathematically combining the initial operational performance metrics measured for the plural defined number of different types of hardware features of the user terminal;
wherein the, responsive to the request to access the content identified by the content identifier through the content server, measuring a present operational performance metric of the user terminal, comprises:
performing for each of the plural defined number of different types of hardware features of the user terminal, measuring operational performance of the type of hardware feature to generate a present operational performance metric for the type of hardware feature; and
wherein the generating a present terminal metric identifier based on the present operational performance metric, comprises mathematically combining the present operational performance metrics measured for the plural defined number of different types of hardware features of the user terminal.

10. The method of claim 9, wherein:
the performing for each of the plural defined number of different types of hardware features of the user terminal, measuring operational performance of the type of hardware feature to generate a present operational performance metric for the type of hardware feature, comprises:
communicating to the content server a content request message containing the user ID and the content identifier;

receiving a terminal identifier challenge message from the content server, the terminal identifier challenge message identifying each of the different types of hardware features of the user terminal to be measured to generate the present terminal metric identifier;

performing for each of the different types of hardware features of the user terminal identified by the terminal identifier challenge message, measuring operational performance of the type of hardware feature to generate a present operational performance metric for the type of hardware feature;

the communicating a combination of the user identifier and the present terminal metric identifier to the content server to request that the user using the user terminal be granted access through the content server to the content identified by the content identifier, comprises:

communicating to the content server a challenge response message containing the present terminal metric identifier.

11. The method of claim 9, wherein:

the mathematically combining the initial operational performance metrics measured for the plural defined number of different types of hardware features of the user terminal, comprises:

generating the initial terminal metric identifier based on a result of hashing the initial operational performance metrics measured for the plural defined number of different types of hardware features of the user terminal; and the mathematically combining the present operational performance metrics measured for the plural defined number of different types of hardware features of the user terminal, comprises:

generating the present terminal metric identifier based on a result of hashing the present operational performance metrics measured for the plural defined number of different types of hardware features of the user terminal.

12. A method comprising:

performing operations as follows on a processor of a content server:

for each of a plurality of user terminals, storing in a repository an initial terminal metric identifier, which is generated based on measurement of an operation performed by the user terminal, associated with a content identifier for content that is available through the content server and further associated with a user identifier;

receiving content request messages from user terminals requesting access to the content available through the content server, each of the content request messages containing a user identifier and a content identifier;

responsive to receiving one of the content request messages from one of the user terminals, determining a level of security defined by a security policy for one of the user identifier and the content identifier and selecting a plural defined number of different types of hardware features as a subset from among a superset of defined types of hardware features based on the determined level of security;

communicating a terminal identifier challenge message to the one of the user terminals that identifies the subset of the plural defined number of different types of hardware features of the one of the user terminals, the terminal identifier challenge message requesting the one of the user terminals to generate a present terminal metric identifier based on measuring operational performance of each of the subset of the plural defined number of different types of hardware features identified by the terminal identifier challenge message;

responsive to communicating the terminal identifier challenge message to the one of the user terminals, receiving from the one of the user terminals a challenge response message containing the present terminal metric identifier which is generated based on measurement the operational performance of each of the subset of the plural defined number of different types of hardware features identified in the terminal identifier challenge message performed by the user terminal;

for each of the content identifiers in the repository, selectively granting access, through the content server to the content having the content identifier, for only ones of the content request messages that contain the present terminal metric identifier which matches the initial terminal metric identifier stored in the repository with an association to the content identifier in the repository matching the content identifier in the content request message and with a further association to the user identifier in the repository matching the user identifier contained in the content request message.

13. The method of claim 12, wherein the, for each of a plurality of user terminals, storing in the repository an initial terminal metric identifier, which is generated based on measurement of an operation performed by the user terminal, associated with a content identifier for content that is available through the content server and further associated with a user identifier, comprises:

receiving from one of the user terminals a content access registration message containing a user identifier and a content identifier;

communicating to the one of the user terminals a terminal identifier request message that requests the one of the user terminals to generate an initial terminal metric identifier based on measurement of a present operation performed by the one of the user terminals;

receiving from the one of the user terminals a response message containing the initial terminal metric identifier; and storing in the repository the initial terminal metric identifier contained in the response message associated with the content identifier contained in the content access registration message and further associated with the user identifier contained in the content access registration message.

14. The method of claim 13, wherein the communicating to the one of the user terminals a terminal identifier request message that requests the one of the user terminals to generate an initial terminal metric identifier based on measurement of a present operation performed by the one of the user terminals, comprises:

generating the terminal identifier request message to request the one of the user terminals to measure an elapsed time for a processor of the one of the user terminals to complete execution of a defined set of operations, wherein the initial terminal metric identifier is based on the elapsed time.

15. The method of claim 13, wherein the communicating to the one of the user terminals a terminal identifier request message that requests the one of the user terminals to generate an initial terminal metric identifier based on measurement of a present operation performed by the one of the user terminals, comprises:

generating the terminal identifier request message to request the one of the user terminals to measure a number of failed memory bytes in a memory of the one of the user terminals, wherein the initial terminal metric identifier is based on the number of failed memory bytes.

16. The method of claim 13, wherein the communicating to the one of the user terminals a terminal identifier request message that requests the one of the user terminals to generate an initial terminal metric identifier based on measurement of a present operation performed by the one of the user terminals, comprises:

generating the terminal identifier request message to request the one of the user terminals to measure an elapsed time between the one of the user terminals communicating a ping request to a network server and receiving a ping response from the network server, wherein the initial terminal metric identifier is based on the elapsed time.

17. The method of claim 13, wherein the communicating to the one of the user terminals a terminal identifier request message that requests the one of the user terminals to generate an initial terminal metric identifier based on measurement of a present operation performed by the one of the user terminals, comprises:

generating the terminal identifier request message to request the one of the user terminals to generate a list of wireless device identifiers that are detected by a transceiver of the one of the user terminals, wherein the initial terminal metric identifier is based on the list of wireless device identifiers.

18. The method of claim 12, wherein, for each of the content identifiers in the repository, the selectively granting access, through the content server to the content having the content identifier, for only ones of the content request messages that contain the present terminal metric identifier which matches the initial terminal metric identifier stored in the repository with an association to the content identifier in the repository matching the content identifier in the content request message and with a further association to the user identifier in the repository matching the user identifier contained in the content request message, comprises:

based on a first portion of one of the content messages from one of the user terminals, determining that the user identifier contained in the one of the content messages is permitted to access the content identifier contained in the one of the content messages only when using a user terminal that can generate the initial terminal metric identifier which is stored in the repository with an association to the content identifier in the repository matching the content identifier in the first portion of the one of the content messages and with a further association to the user identifier in the repository matching the user identifier contained in the first portion of the one of the content messages;

communicating a terminal identifier challenge message to the one of the user terminals, the terminal identifier challenge message requesting the one of the user terminals to generate a present terminal metric identifier based on measurement of the operational performance of each of the subset of the plural defined number of different types of hardware features performed by the one of the user terminals;

receiving from the one of the user terminals a challenge response message containing the present terminal metric identifier, the challenge response message representing a second portion of the one of the content messages from the one of the user terminals;

based on the present terminal metric identifier matching the initial terminal metric identifier which is stored in the repository with an association to the content identifier in the repository matching the content identifier in the first portion of the one of the content messages and with a further association to the user identifier in the repository matching the user identifier contained in the first portion of the one of the content messages, communicating to the one of the user terminals a grant response providing the one of the user terminals access through the content server to the content identified by the content identifier in the first portion of the one of the content messages; and based on the present terminal metric identifier not matching the initial terminal metric identifier which is stored in the repository with an association to the content identifier in the repository matching the content identifier in the first portion of the one of the content messages and with a further association to the user identifier in the repository matching the user identifier contained in the first portion of the one of the content messages, communicating to the one of the user terminals a denial response denying the one of the user terminals access through the content server to the content identified by the content identifier in the first portion of the one of the content messages.

* * * * *